(12) United States Patent
Thomas

(10) Patent No.: US 7,564,509 B2
(45) Date of Patent: Jul. 21, 2009

(54) ILLUMINATION OF OBJECTS USING SPATIAL LIGHT MODULATORS

(75) Inventor: Martin Thomas, Faversham (GB)

(73) Assignee: Cairn Research Limited, Faversham, Kent (GB)

( * ) Notice: Subject to any disclaimer, the term of this patent is extended or adjusted under 35 U.S.C. 154(b) by 534 days.

(21) Appl. No.: 11/485,764

(22) Filed: Jul. 13, 2006

(65) Prior Publication Data
US 2008/0013004 A1  Jan. 17, 2008

(51) Int. Cl.
*G02F 1/135* (2006.01)
(52) U.S. Cl. .................... 349/30; 349/7; 349/8; 349/9; 349/25
(58) Field of Classification Search ............. 349/25, 349/30, 7, 8, 9
See application file for complete search history.

(56) References Cited

U.S. PATENT DOCUMENTS 6,208,774 B1 * 3/2001 Sorin et al. ............... 385/11
7,202,919 B2 * 4/2007 Edwards .................... 349/25

* cited by examiner

Primary Examiner—David Nelms
Assistant Examiner—Phu Vu
(74) Attorney, Agent, or Firm—Barnes & Thornburg LLP

(57) ABSTRACT

Apparatus for illuminating an object comprising a first polarizing beamsplitter (2) which produces a first linearly polarized component (3) and an orthogonally polarized component (5). The two components (3, 5) are focused onto a liquid crystal device (7) having an array of electronically controllable pixel elements each of which is bistable in that it is electronically controllable to occupy either a first state in which the plane of polarization of the light incident on the pixel is rotated by up to 90° or a second state in which the plane of polarization is not changed. The two light beams from the device (7) are incident on a second polarizing beamsplitter (13) which recombines the incident beams into two composite beams one of which represents light rotated by the "on" pixels of the device (7), and this combined beam is refocused onto the object.

10 Claims, 1 Drawing Sheet

ILLUMINATION OF OBJECTS USING SPATIAL LIGHT MODULATORS

FIELD OF THE INVENTION

Figure 1:
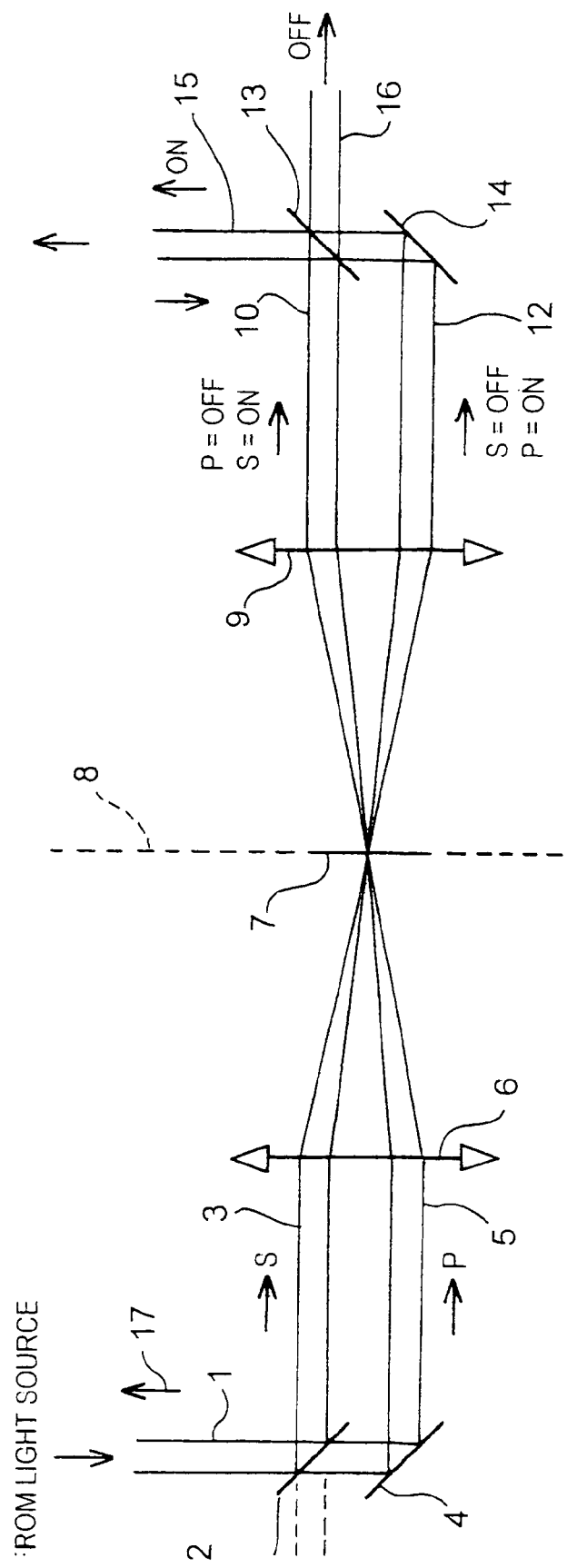

This invention relates to the illumination of objects using spatial light modulators.

BACKGROUND OF THE INVENTION

The use of a light source and some form of spatial light modulator (SLM) to create and then display an image has a variety of applications. Perhaps the most obvious one is a projector, in which the modulation pattern on the SLM represents some form of visual image, and an optical system is then used to project this image onto a screen. Typically the screen is very much larger than the SLM, so the optical system has high magnification in order to achieve this. Therefore the numerical aperture (NA) of the illumination pathway of the SLM is correspondingly higher than that of the screen, since the NA is inversely related to the magnification. In practice, the NA needs to be as high as possible in order to achieve a sufficiently bright screen image.

The two major SLM technologies are digital mirror devices (DMDs), in which each pixel is a miniature mirror that can be rapidly tilted so as either to reflect the illuminating light towards the screen or not, and liquid crystal devices (LCDs), in which each pixel can be controlled so as either to rotate the polarisation of the illuminating light or not, which determines whether or not the light can then reach the screen via a subsequent analyser. Both systems work well when used in conjunction with high NA optics, but DMDs have a problem when the illumination pathway has low NA, as it generally does in microscopy applications, for example. This is because the array of tilted mirrors also acts as a two-dimensional diffraction grating, causing the light leaving the SLM to spread over a larger range of angles than expected from simple reflection. If the subsequent optical pathway has low NA, then much or all of the diffracted light will be lost. Their use in microscopy applications has been described (Krause U.S. Pat. No. 5,587,832, Max Planck EU patents 0911667 and 0916981), but the diffractive losses make them relatively inefficient.

LCDs do not suffer from this problem, but there is now the complication that they require polarised light for their operation, and this invention was devised to address the issues that arise from this requirement. Most light sources are unpolarised, so their output must first be converted to a polarised form. Unpolarised light can be converted into linearly polarised light either by using a filter that transmits only one polarisation, or by using a beamsplitter which transmits one polarisation and reflects the other, thereby allowing both polarisations to be recovered. In both cases this normally reduces the maximum efficiency to 50%, as light of the other polarisation is simply wasted. This is clearly undesirable when the light levels are already limiting.

Various systems have been previously described in which the other polarisation can also be used in LCD applications. These operate by converting it to light of the required polarisation, e.g. by using a half-wave plate, which has the property of rotating linearly polarised light by 90 degrees. The two beams can now be combined, but this is not necessarily an ideal solution. Although one is now using all the light, the overall beam diameter is greater than if the light had all been of the required polarisation to start with. Specifically, if the composite beam is refocussed to produce an image of the light source, there will actually be a separate image for each polarisation, so the radiant intensity (i.e. the light intensity per unit solid angle per unit area of the source) will still be halved from its original value. All such systems will suffer from this problem.

In many applications the loss in radiant intensity may not be important. A true point source, which would have infinite radiant intensity, could be used to generate a perfectly parallel beam, whereas practical light sources, being of finite size, will generate beams that will diverge with distance. In high NA systems such as projectors, the subsequent optics are still likely to be able to accept all the light, in which case there is no problem. However, it is likely to be a problem for applications operating at relatively low NA at the SLM. Low NA here is actually essential in applications, such as microscopy, where a demagnified image of the SLM is to be projected onto an object, since the demagnification will increase the NA at the image to a very high value, thereby limiting the maximum permissible NA at the SLM. This in turn limits the effective size of the light source that can be used for efficient illumination, as only a limited amount of beam divergence can be tolerated.

This invention describes an alternative approach to polarisation recovery, that actually takes advantage of the low NA at the SLM in such applications.

SUMMARY OF THE INVENTION

According to one aspect of the invention there is provided apparatus for controlling the illumination of an object, the apparatus comprising a first polarising beamsplitter for separating incoming light into two linearly polarised components, a spatial light modulator (SLM) onto which the two linearly polarised components are directed and from which the light leaves along two beam pathways, and a second polarising beamsplitter onto which the two beam pathways are directed and from which light is directed to the object, the SLM having an array of elements each of which is switchable between a first state in which the light of a first polarisation is directed into one of the beam pathways and light of a second polarisation is directed into the other of the beam pathways, and a second state in which light of the first polarisation is directed into the other beam pathway and light of the second polarisation is directed into the one beam pathway, the second beamsplitter being operative to combine the light of the first polarisation in the other beam pathway with the light derived from the second polarisation in the one beam pathway, enabling this combined light to be directed to the object.

The SLM is preferably a liquid crystal device which may be a twisted nematic liquid crystal display or a ferroelectric liquid crystal display. In each case, the addressable elements define an array of pixels.

Preferably, the first polarised component is formed by reflection from the first beamsplitter and the second polarised component is formed by transmission through the first beamsplitter and subsequent reflection, the first and second polarised components being parallel before being focused onto the display.

In the preferred embodiment, the other beam pathway is reflected by the second beamsplitter and the one beam pathway is reflected and then transmitted through the second beamsplitter to form the combined light.

The light coming back from the object may be detected confocally, in which light from the object travels through the optical pathway of the apparatus in the reverse direction.

According to another aspect of the invention there is provided a method of controlling the illumination of an object, the method comprising splitting an incident light beam into two polarised components, directing the two components onto a spatial light modulator (SLM) having an array of elements and controlling each element so that the element either directs light of a first polarisation along one beam pathway and light of a second polarisation along another beam pathway or directs the first polarisation along the other beam pathway and the second polarisation along the one beam pathway, using a beamsplitter to combine the first polarisation in the other beam pathway with the second polarisation in the one beam pathway and directing the combined beam to the object.

The present invention thus allows both polarisations to be controlled using only a single display. It takes advantage of the requirement in low NA applications, such as microscopy, for the illuminating light to be a relatively parallel beam. Since the beam is much more parallel than required for the proper operation of the SLM itself, it is possible to send two beams to the SLM at different angles of incidence, while remaining within the permissible optical aperture of the SLM and its associated focusing optics. The radiant intensity of the source is not reduced by this approach.

In the preferred embodiment to be described, the first polarising beamsplitter is used to separate the incident light into its two linearly polarised components, which are then directed onto the SLM which may be the transmissive type, although in practice a reflective display of the Liquid Crystal on Silicon (LCOS) type is likely to be preferred. Although the two polarised beams completely converge at the SLM, they become completely separate at some more distant position, allowing them to be recovered independently. Each polarisation undergoes an equal number of reflections to the other, both going to and coming from the SLM, to avoid one pathway from being laterally inverted with respect to the other.

Liquid crystal displays operate by having the capability of rotating the plane of polarisation of the illuminating light, on a pixel-by-pixel basis. Typically, an "on" pixel will rotate the polarisation by (ideally) up to 90 degrees, whereas on "off" pixel will not change the polarisation state, although it is also possible to construct systems that work in the opposite sense. In conventional systems, where only one polarisation is used, a polarising filter is disposed after the display, to transmit light from the "on" pixels only. In the preferred embodiment of the present invention, light from the "on" pixels will be in opposite polarisation states in the two beam pathways, but they are then combined using the second polarising beamsplitter, into which the two beams are directed at 90 degrees to each other. Light from the "on" pixels will be transmitted for one of the beams and reflected for the other, so that all of the light from these pixels will emerge from the polarising beamsplitter in the same direction. Light from the "off" pixels will be similarly combined, and will emerge at 90 degrees to the light from the "on" pixels.

There are two major types of liquid crystal display, and the invention can use either type. The most common type of display is the twisted nematic one, which operates by circular birefringence. This has the property of rotating plane polarised light by some given amount, regardless of its actual plane of polarisation. Each individual pixel can be controlled independently so that it is either circularly birefringent or not. There is therefore no problem in the requirement to rotate two different polarisations at the same time.

The other major type of liquid crystal display is the ferroelectric one, which operates by linear birefringence, and the situation here is rather more complicated. A linearly birefringement material has two refractive indices, one for light at some particular angle of polarisation, and another for light at 90 degrees to that angle. We can call these the "fast" and "slow" axes of the material, as light at the angle corresponding to the higher refractive index will travel through the material more slowly. Light of an arbitrary polarisation can always be resolved in two components at 90 degrees to each other, corresponding to the fast and slow axes. Since these components travel through the material at different speeds, they will get progressively out of phase, the result of which will be a rotation in the polarisation of the beam when the components are recombined on exiting from the material. However, in the special cases where the light is polarised at an angle corresponding to either the fast or the slow axis of the material, its polarisation state will be unchanged.

In ferroelectric displays, the material is always birefringement, but the angles of the fast and slow axes of each pixel change according to whether the pixel is "on" or "off". Typically, the angles relative to the incoming light polarisation are arranged such that "off" pixels do not rotate the light, i.e. the polarisation angle corresponds exactly to either the fast or slow axis of the material. For "on" pixels, this condition no longer holds, so in this case the polarisation angle of the light is rotated. Therefore, the choice of polarisation angle is much more restricted for ferroelectric displays than for twisted nematic ones. However, it is still possible to simultaneously use two polarisations at right angles to each other, since when one polarisation is oriented to correspond to either the fast or the slow axis, as is required for proper operation, the other polarisation will automatically correspond to the other one.

The ability to use ferroelectric as well as twisted nematic displays is considered to be a very useful feature of this invention. Ferroelectric displays have switching times of only a few microseconds, being close to those of digital mirror devices, whereas twisted nematic displays have switching times of typically several milliseconds, which may be unacceptably slow for some microscopy applications.

In this approach, each display pixel simultaneously controls both polarisations. Since many applications will not involve polarisation effects, this feature is generally considered to be desirable. However, in some cases independent control of polarisation at the pixel level may be useful. This can be achieved in the present invention by imaging the two polarisations side by side on the same display instead of overlaying exactly (or possibly on a second display adjacent to it, so as not to reduce the available size for each polarisation).

When each display pixel is used to control both polarisations simultaneously, it is important that the images of the two polarisations on the display should exactly coincide. This requires that each polarising beamsplitter and its associated 45 degree mirror must be very precisely and stably oriented with respect to each other. This is achievable in practice because they are relatively close together and can be mounted on a common carrier for rigidity.

DETAILED DESCRIPTION OF THE DRAWING

Apparatus forming a preferred embodiment of the invention will now be described, by way of example, with reference to the accompanying drawing which is an optical diagram of the apparatus.

A parallel incident beam 1 of light from a light source (not shown) is incident on a first polarising beamsplitter 2 positioned in a plane at 45 degrees to the beam 1. A first linearly polarised light component 3 (the s component) is reflected by the beamsplitter 2 which also produces a second linearly polarised light component (the p polarisation). This orthogonal component is reflected by a 45 degree mirror 4 to emerge as a second polarised component 5 parallel to the first component 3. The two polarised components 3 and 5 are focused by a lens 6 (or more preferably a mirror) onto a spatial light modulator in the form of a display 7 consisting of a plurality of electronically controllable pixel elements. For clarity, the display is shown as being of the transmissive type, although in practice a reflective display of the liquid crystal on silicon (LCOS) type is preferred, so that in this case the optical diagram must be visualised as being folded about the line shown at 8 in the drawing. Thus, both polarised components s and p are controlled by a single display 7, using eccentric-pupil optics.

At the location of the beamsplitter 2 and the mirror 4 both polarised components are reflected once, so they maintain the same optical relationship to each other. The short distance between the beamsplitter 2 and the mirror 4 provides the necessary physical separation between the two beam pathways at this point, which is arranged to be one focal length away from the lens 6 so that it coincides with the aperture focal plane.

Each pixel element of the display 7 is bistable in that it is electronically controllable to occupy either a first or "on" state in which the plane of polarisation of the light incident on the pixel is rotated by up to 90 degrees, or a second or "off" state in which the plane of polarisation of light incident on the pixel is not changed.

Two light beams emerge from the display 7 and are then brought into parallel relationship by a lens 9 or mirror which, in the case of a reflective display, could be formed as a common element with lens 6. Regardless of whether a particular pixel element is "on" or "off", light incident on that pixel from the first (s) component 3 always follows the lower pathway 12, and light incident on that pixel from the second (p) component 5 always follows the upper pathway 10.

Light following the upper pathway 10 is incident on a second polarising beamsplitter 13 placed at 45 degrees to the common direction of the light pathways. Light following the lower pathway 12 is incident on a mirror 14 also placed at 45 degrees to the common direction of the light pathways, and the light reflected by the mirror 14 is incident on the polarising beamsplitter 13 in a direction orthogonal to the direction of incidence of the light of pathway 10. The polarising beamsplitter 13 thus recombines the incident beams into two composite beams. The first composite beam 15 represents light whose polarisation angle has been rotated by the "on" pixels of the display, i.e. the s component of beam 10 and the p component of beam 12, and this combined beam is refocussed onto the object (focusing optics not shown). The second composite beam 16 represents light from the "off" pixels of the display, which is therefore still in its original polarisation state, and thus corresponds to the p component of beam 10 and the s component of beam 12.

In the case of confocal detection, light from the object passes through the optical system shown in the drawing in the reverse direction, emerging to pass to detectors as indicated by the arrows indicated at 17 and 18 in the drawing, light collected from the "on" pixels following arrow 17 and light collected from the "off" pixels following arrow 18.

In order for the images of the two polarised components to remain accurately aligned on the display, each polarising beamsplitter and its associated mirror must be rigidly held so that they reflect the light at exactly the same angle. However, since the distance between these components is short they can be mounted on a common support which allows this condition to be met satisfactorily in practice.

The invention claimed is:

1. Apparatus for controlling the illumination of an object, the apparatus comprising a first polarising beamsplitter separating incoming light into two linearly polarised components, a spatial light modulator (SLM) onto which the two linearly polarised components are directed and from which the light leaves along two beam pathways, and a second polarising beamsplitter onto which the two beam pathways are directed and from which light is directed to the object, the SLM having an array of elements each of which is switchable between a first state in which light of a first polarisation is directed into one of the beam pathways and light of a second polarisation is directed into the other of the beam pathways, and a second state in which light of the first polarisation is directed into the other beam pathway and light of a second polarisation is directed into the one beam pathway, the second beamsplitter being operative to combine the light of the first polarisation in the other beam pathway with the light of the second polarisation in the one beam pathway, enabling this combined light to be directed to the object.

2. Apparatus according to claim 1, wherein the SLM is a liquid crystal device.

3. Apparatus according to claim 2, wherein the SLM is a twisted nematic liquid crystal display.

4. Apparatus according to claim 2, wherein the SLM is a ferroelectric liquid crystal display.

5. Apparatus according to claim 1, wherein a first component is formed by reflection from the first beamsplitter and the second component is formed by transmission by the first beamsplitter and subsequent reflection, the first and second components being parallel before being focused onto the SLM.

6. Apparatus according to claim 1, wherein the other beam pathway is reflected by the second beamsplitter and the one beam pathway is reflected and then transmitted through the second beamsplitter to form the combined light.

7. Apparatus according to claim 1, wherein the SLM is reflective.

8. Apparatus according to claim 1, wherein detection is confocal, the light from the object passing through the optical pathway of the apparatus in the reverse direction.

9. A method of controlling the illumination of an object comprising splitting an incident light beam into two linearly polarised components, directing the two components onto a spatial light modulator (SLM) having an array of elements, and controlling each element so that the element either directs light of a first polarisation along one beam pathway and light of a second polarisation along another beam pathway, or directs the first polarisation along the other beam pathway and the second polarisation along the one beam pathway, using a polarising beamsplitter to combine the first polarisation in the other beam pathway with the second polarisation in the one beam pathway, and directing the combined beam to the object.

10. A method according to claim 9, wherein the combined beam is derived from those elements which occupy an "on" state.

* * * * *